United States Patent Office 3,408,348
Patented Oct. 29, 1968

3,408,348
AZINEDIONES
James C. Martin and Ronald H. Meen, Kingsport, Tenn., assignors to Eastman Kodak Company, Rochester, N.Y., a corporation of New Jersey
No Drawing. Filed May 26, 1966, Ser. No. 553,029
7 Claims. (Cl. 260—243)

ABSTRACT OF THE DISCLOSURE

The preparation of oxazinediones and thiazinediones by reacting a malonyl chloride with an aryl or heterocyclic amide or thioamide. The oxazinediones and thiazinediones can be reacted with alcohol to form N-acylmalonamates and N-thioacylmalonamates which are useful as plasticizers for resins such as cellulose acetate.

This invention relates to a novel process for preparing certain oxazinediones and thiazinediones. More specifically, it relates to a novel process for combining substituted malonyl chlorides with aryl, substituted aryl or heterocyclic, amides or thioamides to produce respectively certain substituted 4H-1,3-oxazine-4,6(5H)-diones and 4H-1,3-thiazine-4,6(5H)-diones. It further relates to novel thiazinedione compounds as novel compositions of matter.

The reaction of disubstituted malonyl chlorides with aromatic or heterocyclic amides or thioamides and the thiazinedione compounds of this invention have not been described in the literature. In a recent article by Ziegler and Meindl in Monatsh. Chem., 95, 1318 (1964) the reaction of monosubstituted malonyl chlorides with aromatic amides to obtain the enol form of certain 4H-1,3-oxazine-4,6(5H)-diones is revealed. The authors state that disubstituted malonyl chlorides do not react with aromatic amides.

It is an object of this invention to provide certain thiazinediones as novel compositions of matter.

Another object is to provide a method for combining substituted malonyl chlorides with aromatic or heterocyclic amides and with aromatic or heterocyclic thioamides.

Still another object is to present a method for the preparation of certain oxazinediones and thiazinediones.

These and other objects are attained by the practice of this invention which, briefly, comprises mixing a disubstituted malonyl chloride with aromatic or heterocyclic amides or thioamides in an inert solvent either with or without a hydrogen chloride acceptor and isolating the product.

More specifically the process of this invention comprises reacting an amide or thioamide having the formula

with a malonyl chloride having the formula

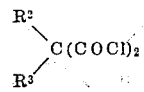

to obtain a compound having the formula

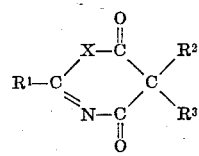

wherein X is selected from a group consisting of oxygen and sulfur; the substituent R¹ is selected from the group consisting of aryl having from 6 to 14 carbon atoms and heterocyclic groups containing from 4 to 7 carbon atoms in the heterocyclic nucleus; each of the substituents $R^2$ and $R^3$, when taken singly, are alkyl having from 1 to 8 carbon atoms and mononuclear aryl having from 6 to 10 carbon atoms; and the substituents $R^2$ and $R^3$, when taken collectively with the carbon atom to which they are attached, represent joined alkylene groups completing a carbocyclic ring of 4 to 6 ring carbon atoms.

The amides that are useful in this invention are well-known compounds and may be prepared by a variety of methods. Suitable amides include the following compounds:

benzamide,
p-chlorobenzamide,
o-ethoxybenzamide,
m-nitrobenzamide,
2-pyridinecarboxamide,
2-naphthalenecarboxamide,
2-furamide,
p-toluamide, etc.

The thioamides that are used in this invention are well-known compounds and may be prepared by a variety of methods. A few examples of the thioamides that are suitable are:

thiobenzamide,
p-chlorothiobenzamide,
m-nitrothiobenzamide,
2-thiofuramide, etc.

The substituted malonyl chlorides that are suitable for the present process include the following:

diphenylmalonyl chloride,
dimethylmalonyl chloride,
diethylmalonyl chloride,
ethylmethylmalonyl chloride,
dibutylmalonyl chloride,
butylethylmalonyl chloride,
methylpropylmalonyl chloride,
dioctylmalonyl chloride,
butyloctylmalonyl chloride,
pentamethylenemalonyl chloride,
dibenzylmalonyl chloride, etc.

These compounds may be prepared according to known techniques by reacting the corresponding dialkylmalonic acid with thionyl chloride or a similar chlorinating agent.

In the practice of this invention, for best operation, a hydrogen chloride acceptor material is not used. It is preferred to let the hydrogen chloride, that is evolved during the course of the reaction, volatilize.

In the process for preparing the 4H-1,3-oxazine-4,6(5H)-diones and 4H-1,3-thiazine-4,6(5H)-diones, by reacting the substituted malonyl chlorides with the amides or thioamides, it is preferred, but not necessary, to use a solvent. Suitable solvents include those that are substantially unaffected by dry hydrogen chloride. Classes of such solvent materials are aliphatic and aromatic hydrocarbons and chlorinated hydrocarbons and aliphatic and aromatic nitro compounds.

The temperature of the subject reaction is generally governed by the nature of the reactants with the suitable reaction temperature within the range of from 25° to 250° C. However, most of the reagents combine readily at temperatures ranging from 60° to 150° C.

The compounds produced by the present invention are useful as intermediates in the preparation of plasticizers for various resins. A 4H-1,3-thiazine-4,6(5H)-dione or a 4H-1,3-oxazine-4,6(5H)-dione of the present invention may be reacted with an alcohol to produce the respective esters, N-thioacylmalonamates and N-acylmalonamates.

The resulting N-acylmalonamates and N-thioacylmalonamates are useful as plasticizers for various resins such as cellulose acetate butyrate. The resin and a N-acylmalonamate or N-thioacylmalonamate may be milled together on heated rolls to form a plastic having good quality and appearance.

Suitable alcohols which may be used in the reaction for forming N-acylmalonamates and N-thioacylmalonamates include methyl alcohol, ethyl alcohol, propyl alcohol, isopropyl alcohol, butyl alcohol, isobutyl alcohol, octyl alcohol, isooctyl alcohol, decyl alcohol, lauryl alcohol, benzyl alcohol, etc. Phenols and substituted phenols are also suitable.

EXAMPLE 1

A solution of benzamide (24.2 g.; 0.2 mole) and dimethylmalonyl chloride (37.2 g.; 0.22 mole) in ethylene dichloride (125 ml.) was refluxed for 13 hrs. The solvent was removed in vacuo to give 54 g. of crude product. Recrystallization of this material from carbon tetrachloride gave 27 g. (62%) of 5,5-dimethyl-2-phenyl-4H-1,3-oxazine-4,6(5H)-dione, M.P. 132–135° C. The following equation illustrates the reaction that took place.

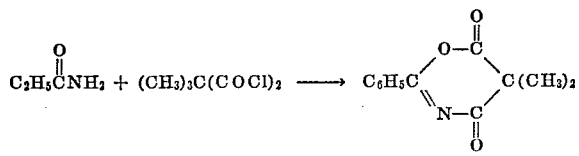

*Analysis.*—Calcd. for $C_{12}H_{11}NO_3$: C, 66.4; H, 5.1; N, 6.5. Found: C, 65.9; H, 5.2; N, 6.3.

EXAMPLE 2

A mixture of o-toluamide (21.2 g.; 0.157 mole), dimethylmalonyl chloride (27.0 g.; 0.16 mole) and ethylene dichloride (150 ml.) was refluxed for 10 hrs. The solvent was removed under vacuum to give 38.9 g. of solid residue. Recrystallization from carbon tetrachloride afforded 28.9 g. of 5,5-dimethyl-2-o-tolyl-4H-1,3-oxazine-4,6(5H)-dione, M.P. 124–125° C. The following equation represents the reaction that occurred.

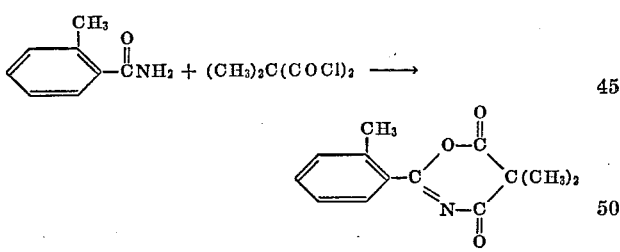

*Analysis.*—Calcd. $C_{12}H_{13}NO_3$: C, 67.5; H, 5.7; N, 6.0. Found: C, 67.3; H, 5.9; N, 6.1.

EXAMPLE 3

A solution of thiobenzamide (27.4 g.; 0.2 mole) and dimethylmalonyl chloride (37.2 g.; 0.22 mole) in ethylene dichloride (125 ml.) was refluxed for 3 hrs. Removal of the solvent under vacuum afforded 52 g. of crude product. Recrystallization of this material from carbon tetrachloride to give 41 g. of 5,5-dimethyl-2-phenyl-4H-1,3-thiazine-4,6(5H)-dione, M.P. 56–58° C. The reaction that occurred is represented by the following equation.

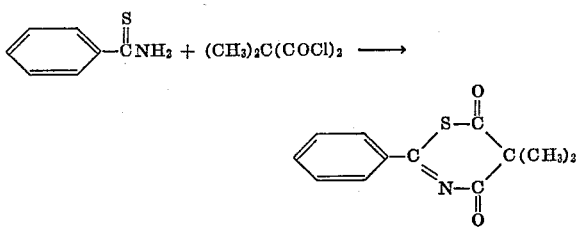

*Analysis.*—Calcd. for $C_{12}H_{11}NO_2S$: C, 61.8; H, 4.8; N, 6.0. Found: C, 61.8; H, 4.4; N, 5.6.

EXAMPLE 4

A mixture of 2-furamide (30 g.; 0.27 mole), dimethylmalonyl chloride (50.6 g.; 0.3 mole) and ethylene dichloride (250 ml.) was refluxed for 8 hrs. Evaporation of the solvent gave a solid residue that after recrystallization from a mixture of hexane and benzene gave 51.4 g. of 2 - (2-furyl)-5,5-dimethyl-4H-1,3-oxazine-4,6(5H)-dione. The reaction that took place is illustrated by the following equation

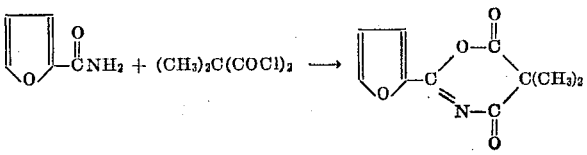

EXAMPLE 5

Under the general conditions and process of Example 1, the following substituted malonyl chlorides and amides react to give the products shown.

| Amide | Malonyl Chloride | Product |
|---|---|---|
| CH₃-C₆H₄-CNH₂ | (CH₃)₂C(COCl)₂ | CH₃-C₆H₄-oxazinedione-C(CH₃)₂ |
| pyridyl-CNH₂ | (CH₃)₂C(COCl)₂ | pyridyl-oxazinedione-C(CH₃)₂ |
| C₂H₅O-C₆H₄-CNH₂ | C₄H₉\C(COCl)₂ / C₂H₅ | C₂H₅O-C₆H₄-oxazinedione with C₄H₉ and C₂H₅ |

| Amide | Malonyl Chloride | Product |
|---|---|---|

Although the invention has been described in considerable detail with particular reference to certain preferred embodiments thereof, variations and modifications can be effected within the spirit and scope of the invention as described hereinbefore, and as defined in the appended claims.

What is claimed is:

1. A process for preparing an azinedione which comprises contacting a compound having the formula $$R^1\overset{X}{\underset{\|}{C}}NH_2$$

with a malonyl chloride having the formula $$\overset{R^2}{\underset{R^3}{>}}C(COCl)_2$$

at a temperature of about 25° C. to about 250° C. and in the presence of an inert solvent to obtain a compound having the formula wherein X is selected from the group consisting of oxygen and sulfur; the substituent $R^1$ is aryl selected from phenyl, tolyl, ethoxyphenyl, nitrophenyl, naphthyl, or chlorophenyl or a heterocyclic group selected from furyl, pyridyl, or thienyl; each of the substituents $R^2$ and $R^3$, when taken singly, is phenyl or alkyl having from 1 to 8 carbon atoms; and the substituents $R^2$ and $R^3$, when taken collectively with the carbon atom to which they are attached, represent joined alkylene groups completing a carbocyclic ring of 4 to 6 ring carbon atoms.

2. A process according to claim 1 wherein the reaction is carried out in the presence of a hydrogen chloride acceptor material.

3. A thiazinedione having the formula wherein the substituent $R^1$ is aryl selected from phenyl, tolyl, ethoxyphenyl, nitrophenyl, naphthyl, or chlorophenyl or a heterocyclic group selected from furyl, pyridyl, or thienyl; each of the substituents $R^2$ and $R^3$, when taken singly, is phenyl or alkyl having from 1 to 8 carbon atoms; and the substituents $R^2$ and $R^3$, when taken collectively with the carbon atom to which they are attached, represent joined alkylene groups completing a carbocyclic ring of 4 to 6 ring carbon atoms.

4. A compound as defined in claim 3 having the formula

5. A compound as defined in claim 3 having the formula

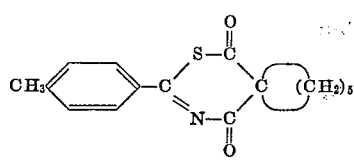

6. A compound as defined in claim 3 having the formula

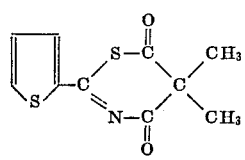

7. A compound as defined in claim 3 having the formula

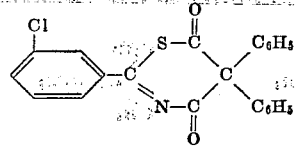

References Cited

UNITED STATES PATENTS 3,004,971  10/1961  Skinner et al. _____ 260—243
3,336,305  8/1967  Scarborough et al. ___ 260—243

OTHER REFERENCES

Ziegler et al.: Monatsh. Chem., vol. 95, pp. 1318–28 (1964).

Goerdeler et al.: Chemische Berichte, vol. 93, pp. 671–8 (1960) QD 1. D4.

HENRY R. JILES, *Primary Examiner.*

NORMA S. MILESTONE, *Examiner.*

J. M. FORD, *Assistant Examiner.*